Sept. 28, 1965         A. F. DE FRAINE         3,208,356
HYDRAULIC POWER SYSTEMS
Filed July 12, 1962
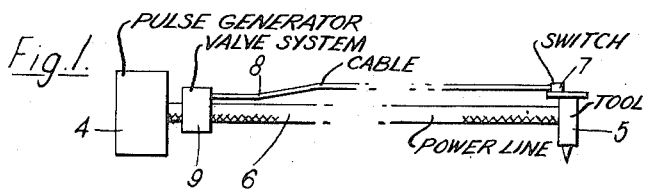
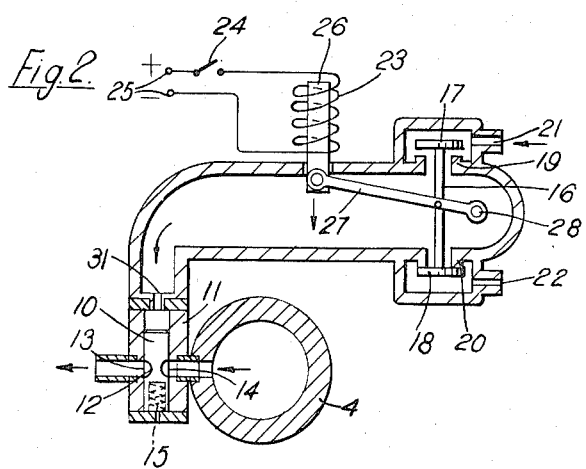
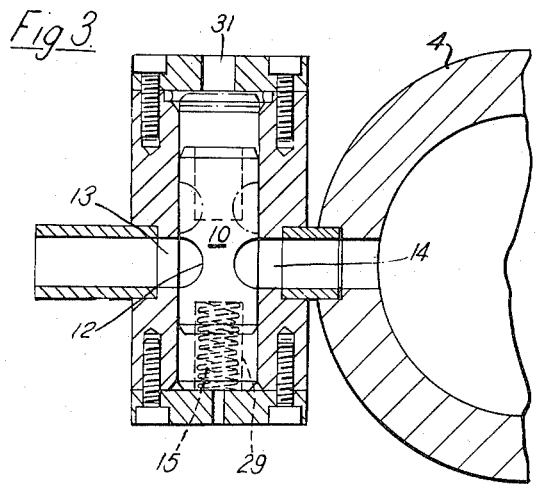
Inventor
Allan F. De Fraine
By Kemon, Palmer,
Stewart & Estabrook
Attorneys 3,208,356
HYDRAULIC POWER SYSTEMS
Allan Fred de Fraine, London, England, assignor to Sonomotive Engineers Limited, Strand, London, England, a British company
Filed July 12, 1962, Ser. No. 209,325
3 Claims. (Cl. 91—459)

This invention relates to alternating pressure hydraulic power systems and has for its object to provide improved means for cutting off the supply of power from the generator when the receiver is not in use.

According to the present invention, the power line is controlled by a main valve consisting of a plunger which is axially movable within a cylinder provided with inlet and outlet ports from an open position in which it connects the ports to a closed position in which the ports are not connected, and a reversing means which in one of its positions subjects the valve to the action of a hydraulic pressure line, whereby actuation of the reversing means results in the movement of the supply control valve from one position to the other. The reversing valve may conveniently consist of a selector valve which selectively connects the main valve to a pump or to exhaust, and the hydraulic pressure exerted on the main valve may act against a spring. The reversing valve may be operated by an electromagnetic solenoid.

In alternating pressure hydraulic power systems using flexible rubber or the like pipes to convey the power from the pulse generator to the point of application or use, it has been found essential in order to increase the life of the pipe, to reduce hysteresis in the pipe line and for general convenience to provide a means of controlling the entry of the power or pulses to the pipe line at or near the source. The system formerly in use is to shut off the power at or near the point of application, which may be simply done by means of a valve or cock and causes no trouble in static pressure air or hydraulic lines, but with alternating pressures this simple method is very unsatisfactory in that although the power may be used only intermittently the pipe line is subjected to high alternating pressures continuously which will materially shorten its useful life; moreover as the pipe is flexible and unrestricted, the alternating pressures cause standing waves and vibratory movements of the pipe so that when the power is shut off at the point of application the deterioration of the pipe is further accelerated by fretting and rubbing on the ground or other surfaces and by the build-up of undesired excessive pressures by phase effects.

With the valve arrangement described above, a control switch may be located on a tool which is energised from the generator through the power line and the valve system may be located close to the source of alternating pressure so that the alternating pressure is removed from the power line as well as from the tool, thereby eliminating the abovementioned disadvantages.

In order that the invention may be better understood an embodiment thereof will now be described with reference to the accompanying drawings, in which:

FIGURE 1 shows diagrammatically the arrangement of the generator and receiver;

FIGURE 2 shows in cross-section the valve system provided at the generator; and

FIGURE 3 is an enlarged view of the main valve.

Referring to FIGURE 1, the generator 4 supplies alternating pressure hydraulic power to a tool 5 through a power line 6. The tool 5 is provided with an electric switch, in a casing 7, connected through a cable 8 to a valve system 9 by means of which the generator 4 is connected or disconnected from the power line.

FIGURE 2 illustrates the valve system 9 at the generator. The main valve consists of a plunger 10 (see also FIGURE 3) operating in a cylinder 11. The plunger is provided with an annular groove 12 which, in the "on" position of the valve is in register with ports 13 and 14 in the cylinder 11. The port 14 is connected to the generator 4 and the port 13 is connected to the power line 6. The lower end of the cylinder 11 is closed and a spring 15 is arranged between the closed end of the cylinder and the upper end of an axial bore 29 in the plunger 10. The upper end of the cylinder 11 communicates through a port 31 with the auxiliary valve, which consists of a spindle 16 to the upper ends of which are connected disc-shaped closure members 17 and 18 which co-operate respectively with valve seats 19 and 20. The length of the spindle 16 is such that the closure members cannot both be seated at the same time. When the upper closure member 17 is raised, as in the drawing, the upper end of the plunger 10 of the main valve is in communication with a pump through the outlet 21. When the closure member 18 is away from its seating the upper end of the plunger 10 is in communication with the exhaust port 22.

The position of the spindle 16 is controlled by means of a solenoid, the winding 23 of which is connected to supply terminals 25 through contacts 24 at the point of application, the contacts 24 being enclosed within the switch casing 7 of FIGURE 1. To the lower end of the solenoid core 26 there is connected a lever 27 which is pivoted at 28 and which is connected at an intermediate point along its length to the spindle 16. The arrangement is such that when the solenoid is energized the spindle 16 is in one of its extreme positions and when the solenoid is de-energized the spindle 16 moves to its other extreme position.

The electrical conduit 8 connected between the switch at the tool and the valve arrangement at the generator is preferably contained within the tube or within the wall of the tube which constitutes the power line conveying the pulsations to the tool. Thus, the pipe line may be made of flexible rubber and may incorporate a braided metal reinforcement in its wall which will serve as one lead of the electric circuit connecting the solenoid to the switch. The other lead may be inserted in an annular space between the rubber pipe and a plastic or other insulating loose covering. This loose covering also serves to reduce the wear of the main pressure transmission line by fretting. This wear occurs very rapidly and may lead to destruction of the pipe. A plastic cover has been found to be much more resistant to this type of wear and is cheaper than the rubber pipe line.

If desired, both leads may be incorporated in the wall of the plastic cover during its manufacture. The electrical connection to the switch at the tool may be in the form of terminals or may be a jack plug connection or an insulating sliding sleeve incorporating two contacts for mating with fixed terminal contacts provided on the tool. A similar device can be used at the other end of the pipe line.

Alternatively an external insulated conductor, with the braid serving as part of an earth return system, may be used, or two external conductors may be used, or in some cases the braid may be used as the conductor with the frame attached to one side of the battery as the earth return.

In yet a further alternative, a two-wire cable is inserted inside the flexible pipe carrying the alternating hydraulic pressures but in this case the union connections will require to be specially manufactured in order to provide a suitable insulated exit sealed against high pressures for the electrical conductors from the interior of the pipe line so that they may be connected into the desired circuit; or one of these conductors can be replaced by the braid in the pipe itself.

The use of a relay valve arrangement enables a low-voltage solenoid to be used to operate the reversing means. This low voltage can be readily obtained from the starter battery or generator which is usually available in the conditions of use of the tool.

I claim:
1. An alternating pressure hydraulic power system comprising:
   a hydraulic generator for producing pulsating hydraulic power;
   a receiver;
   a power line connecting said generator to said receiver for the transmission of pulsating hydraulic power;
   a second line which is selectively subjected to positive pressure or atmospheric pressure;
   a valve device located at said generator and including a main valve, an auxiliary valve, and an electrical device for operating said auxiliary valve, said main valve having inlet and outlet ports connected to said generator and said power line respectively and a movable valve member to transmit or block pulsating pressures in the opened and closed positions respectively of the valve, said auxiliary valve and said main valve being connected in said second line in order to operate said main valve;
   manually operated switching means located at said receiver; and
   means electrically connecting said switching means and said electrical device at said generator, whereby operation of said switching means at said receiver disconnects the pulsating hydraulic power generator both from said receiver and said power line.

2. A system as defined by claim 1 in which said main valve comprises:
   a cylinder having inlet and outlet ports;
   a piston movable in said cylinder to connect said ports in one position and to block said ports in another position;
   and spring means biasing said piston in a direction to oppose the force applied from said second line.

3. A system according to claim 1 in which said electrical device is an electromagnetic solenoid.

References Cited by the Examiner

UNITED STATES PATENTS

| | | | |
|---|---|---|---|
| 837,512 | 12/06 | Seeley | 138—138 |
| 941,409 | 11/09 | Ehrhart | 60—52 X |
| 2,207,809 | 7/40 | Lauffer et al. | 251—30 X |
| 2,518,892 | 8/50 | Hollingsworth | 138—49 |
| 2,524,522 | 10/50 | Gilmore | 138—56 |
| 2,890,264 | 6/59 | Duff | 138—138 X |
| 2,955,917 | 10/60 | Roberts | 60—50 X |
| 3,068,650 | 12/62 | Phillips | 60—54.5 |
| 3,080,720 | 3/63 | Downs | 60—54.5 |

FOREIGN PATENTS

| | | |
|---|---|---|
| 191,686 | 9/57 | Austria. |
| 1,245,158 | 9/60 | France. |

JULIUS E. WEST, *Primary Examiner.*

LAURENCE D. GEIGER, *Examiner.*